United States Patent
Deen et al.

(10) Patent No.: US 9,704,515 B2
(45) Date of Patent: Jul. 11, 2017

(54) LATERAL SPIN VALVE READER WITH IN-PLANE DETECTOR

(71) Applicant: Seagate Technology LLC, Cupertino, CA (US)

(72) Inventors: David A. Deen, Edina, MN (US); Levent Colak, Chanhassen, MN (US); Thomas Roy Boonstra, Chaska, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/869,402

(22) Filed: Sep. 29, 2015

(65) Prior Publication Data
US 2017/0092305 A1 Mar. 30, 2017

(51) Int. Cl.
*G11B 5/39* (2006.01)
*G11B 5/127* (2006.01)

(52) U.S. Cl.
CPC .......... *G11B 5/3912* (2013.01); *G11B 5/1272* (2013.01); *G11B 5/3906* (2013.01); *G11B 5/3932* (2013.01); *G11B 5/3958* (2013.01)

(58) Field of Classification Search
CPC ... G11B 5/3906; G11B 5/3912; G11B 5/3932; G11B 5/3958
USPC ........ 360/324, 324.1, 324.12, 319, 322, 316
See application file for complete search history.

(56) References Cited

U.S. PATENT DOCUMENTS

| | | | |
|---|---|---|---|
| 7,020,013 B2 | 3/2006 | Johnson | |
| 7,193,891 B2 | 3/2007 | Johnson | |
| 7,209,328 B2 | 4/2007 | Ito et al. | |
| 7,280,322 B2 | 10/2007 | Takahashi et al. | |
| 7,298,597 B2 | 11/2007 | Carey et al. | |
| 7,522,392 B2 | 4/2009 | Carey et al. | |
| 8,072,713 B2 | 12/2011 | Yamada et al. | |
| 8,238,064 B2 * | 8/2012 | Yamada ................. | B82Y 25/00 360/319 |
| 8,619,393 B2 | 12/2013 | Stokes | |
| 8,717,715 B1 | 5/2014 | Sato et al. | |
| 8,929,034 B2 | 1/2015 | Stokes | |
| 8,988,832 B2 | 3/2015 | McNeill et al. | |
| 9,019,664 B2 | 4/2015 | Song et al. | |
| 9,042,061 B2 | 5/2015 | Dimitrov et al. | |
| 9,064,509 B2 | 6/2015 | Dimitrov et al. | |
| 9,123,361 B1 * | 9/2015 | Kief ....................... | G11B 5/265 |
| 9,196,273 B2 * | 11/2015 | Shirotori ............... | G11B 5/398 |
| 9,478,240 B1 * | 10/2016 | Deen ..................... | G11B 5/3951 |
| 2006/0022220 A1 | 2/2006 | Inomata et al. | |
| 2007/0253116 A1 | 11/2007 | Takahashi | |
| 2007/0253121 A1 | 11/2007 | Yamada et al. | |
| 2009/0154030 A1 | 6/2009 | Yamada et al. | |
| 2010/0119875 A1 | 5/2010 | Sasaki | |
| 2011/0042648 A1 | 2/2011 | Koo et al. | |
| 2014/0168812 A1 * | 6/2014 | Braganca ............... | G01R 33/00 360/75 |

(Continued)

*Primary Examiner* — Jefferson Evans
(74) *Attorney, Agent, or Firm* — Westman, Champlin & Koehler, P.A.

(57) ABSTRACT

A lateral spin valve reader includes a detector located proximate to a bearing surface of the reader, a spin injector located away from the bearing surface, and a channel layer that substantially extends from the detector to the spin injector. The channel layer and the detector are substantially in a same plane.

12 Claims, 10 Drawing Sheets

(56) References Cited

U.S. PATENT DOCUMENTS

2015/0035524 A1* 2/2015 Sasaki ............... G01R 33/093
  324/244
2016/0154071 A1* 6/2016 Sasaki ............... G01R 33/093
  360/313

* cited by examiner

«LATERAL SPIN VALVE READER WITH IN-PLANE DETECTOR»

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor has traditionally been employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

The ever increasing need for increased data storage necessitates ever increasing data density in magnetic data storage devices. One way to increase data density is to decrease the size and spacing of magnetic bits recorded on the media. The read sensor is generally sandwiched between a pair of magnetic shields, the spacing between which determines the bit length, also referred to as gap thickness. Sensors such as GMR or TMR sensors are constructed as a stack of layers all formed upon one another sandwiched between the magnetic shields. Accordingly, the ability to reduce the spacing between shields with such a sensor structure is limited.

SUMMARY

The present disclosure relates to a lateral spin valve reader that addresses scaling challenges posed by greater data density requirements and includes at least two primary elements that are in a same plane to further reduce spacing between shields of the reader. The lateral spin valve reader includes a detector located proximate to a bearing surface of the reader, a spin injector located away from the bearing surface, and a channel layer that substantially extends from the detector to the spin injector. The channel layer and the detector are substantially in a same plane.

Other features and benefits that characterize embodiments of the disclosure will be apparent upon reading the following detailed description and review of the associated drawings.

DETAILED DESCRIPTION OF ILLUSTRATIVE EMBODIMENTS

Magnetic reader embodiments described below relate to lateral spin valve (LSV) readers that include a spin injector, a detector and a channel layer substantially extending from the spin injector to the detector. The spin injector injects electron spins into the channel layer, which transports the spins to the detector. In different embodiments, the channel layer and the detector are substantially in a same plane to provide a drastic reduction in shield-to-shield spacing in the reader. Prior to providing additional details regarding the different embodiments, a description of an illustrative operating environment is provided below.

Figure 1:
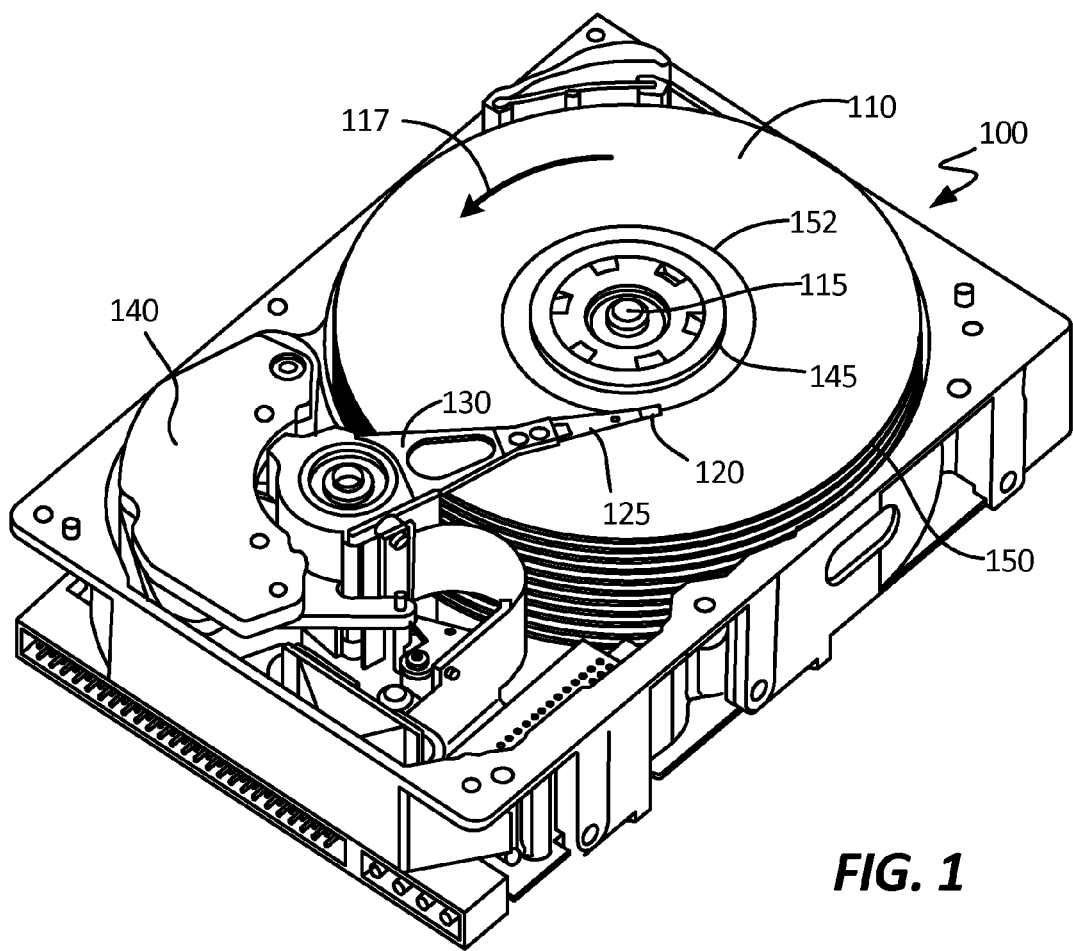
FIG. 1 is a perspective view of a data storage system.
Figure 2:
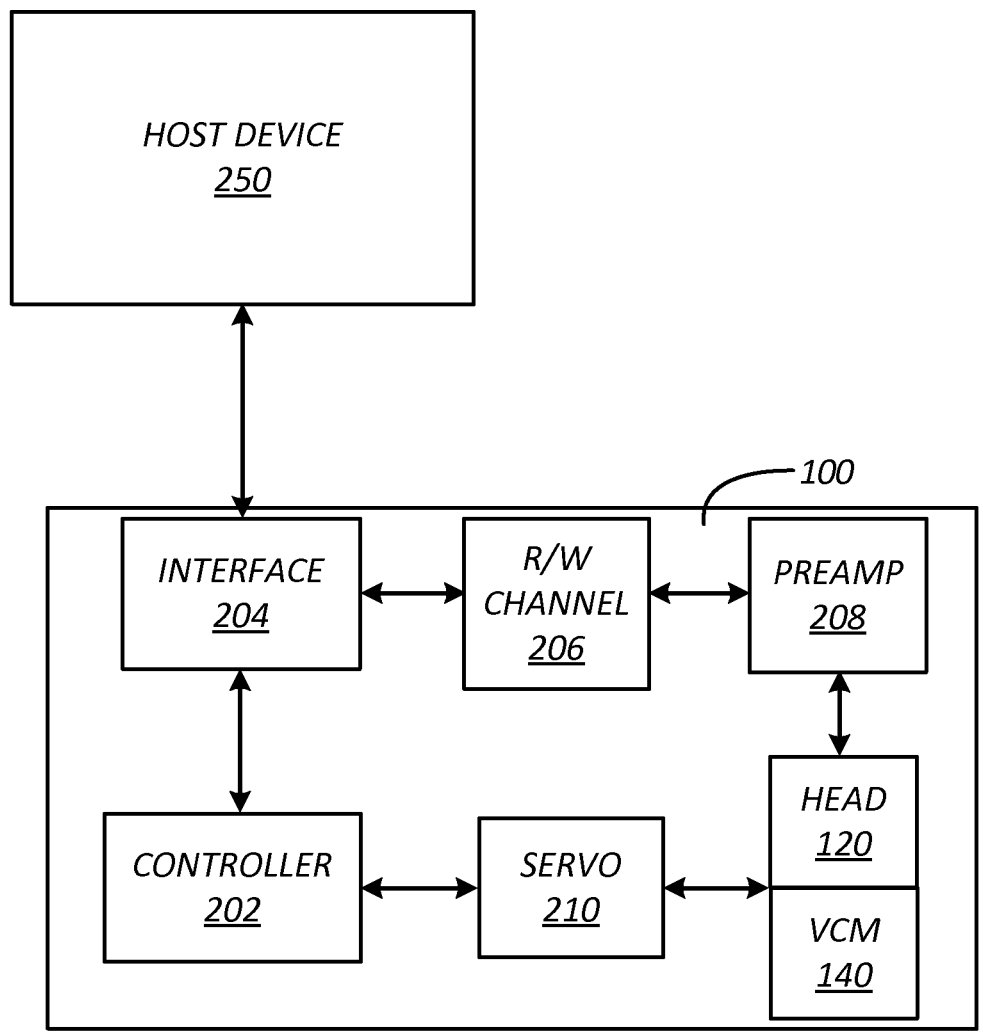
FIG. 2 is a generalized functional block diagram of a data storage system.

FIGS. 1 and 2 together show an illustrative operating environment in which certain specific embodiments disclosed herein may be incorporated. The operating environment shown in FIGS. 1 and 2 is for illustration purposes only. Embodiments of the present disclosure are not limited to any particular operating environment such as the operating environment shown in FIGS. 1 and 2. Embodiments of the present disclosure are illustratively practiced within any number of different types of operating environments.

FIG. 1 is a perspective view of a hard disc drive 100. Hard disc drives are a common type of data storage system. While embodiments of this disclosure are described in terms of disc drives, other types of data storage systems should be considered within the scope of the present disclosure. The same reference numerals are used in different figures for same or similar elements.

Disc drive 100 includes a data storage medium (for example, a magnetic disc) 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated recording head 120 that carries a read transducer and a write transducer for communication with the surface of the disc. Each head 120 is supported by a head gimbal assembly 125. Each head gimbal assembly (HGA) 125 illustratively includes a suspension and a HGA circuit. Each HGA circuit provides electrical pathways between a recording head and associated hard disc drive electrical components including preamplifiers, controllers, printed circuit boards, or other components. Each suspension mechanically supports an HGA circuit and a recording head 120, and transfers motion from actuator arm 130 to recording head 120. Each actuator arm 130 is rotated about a shaft by a voice coil motor assembly 140. As voice coil motor assembly 140 rotates actuator arm 130, head 120 moves in an arc between a disc inner diameter 145 and a disc outer diameter 150 and may be positioned over a desired track such as 152 to read and/or write data.

FIG. 2 is a generalized block diagram of illustrative control circuitry for the device shown in FIG. 1. The control circuitry includes a processor or controller 202 that directs or manages the high level operations of device 100. An interface circuit 204 facilitates communication between device 100 and a host device 250. A read/write channel 206 operates in conjunction with a preamplifier/driver circuit (preamp) 208 to write data to and to read data from a data storage medium such as medium 110 in FIG. 1. Preamp 208 also optionally acts as a power supply to electrical components included in a recording head such as a read transducer, a write transducer, heaters, etc. Preamp 208 is illustratively electrically connected to recording head 120 through a HGA circuit that is connected to preamp 208 and to one or more recording head 120 electrical connection points. A servo circuit 210 provides closed loop positional control for voice coil motor 140 that positions recording head 120.

Figure 3A:
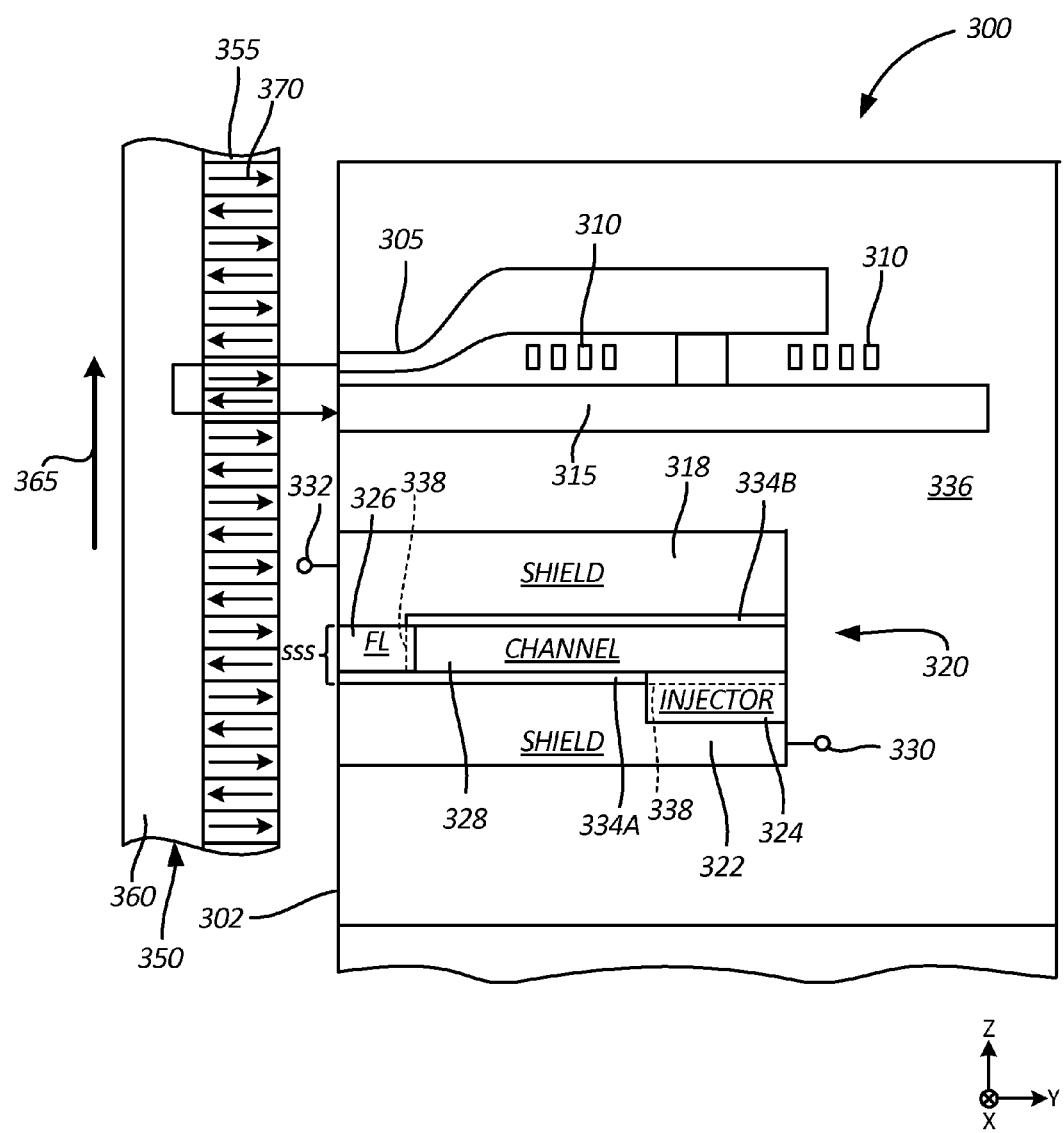
FIG. 3A is a schematic diagram of a cross-section of one embodiment of a recording head that reads from and writes to a storage medium.

FIG. 3A is a schematic diagram showing a cross-sectional view of portions of a recording head 300 and a data storage medium 350 taken along a plane substantially normal to a plane of a bearing surface (for example, an air bearing surface (ABS)) 302 of recording head 300. The recording head elements shown in FIG. 3A are illustratively included in a recording head such as recording head 120 in FIGS. 1 and 2. Medium 350 is illustratively a data storage medium such as medium 110 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 300 includes a write pole 305, a magnetization coil 310, a return pole 315, a top shield 318, a read transducer 320, a bottom shield 322 and a wafer overcoat 336. Storage medium 350 includes a recording layer 355 and an underlayer 360. Storage medium 350 rotates in the direction shown by arrow 365. Arrow 365 is illustratively a direction of rotation such as arrow 117 in FIG. 1.

In an embodiment, electric current is passed through coil 310 to generate a magnetic field. The magnetic field passes from write pole 305, through recording layer 355, into underlayer 360, and across to return pole 315. The magnetic field illustratively records a magnetization pattern 370 in recording layer 355. Read transducer 320 senses or detects magnetization patterns in recording layer 355, and is used in retrieving information previously recorded to layer 355.

In the embodiment shown in FIG. 3A, read transducer 320 is a LSV reader. LSV reader 320 includes a spin injector 324, a detector 326 and a channel layer 328.

The spin injector 324 may include an electrically conductive, magnetic layer (not separately shown) that has a magnetization that is pinned in a direction (preferably perpendicular to the bearing surface). Pinning of the magnetization of the pinned magnetic layer may be achieved by, for example, exchange coupling with a layer of anti-ferromagnetic material (not separately shown).

The detector 326 may include a magnetic, electrically conductive layer having a magnetization that is free to move in response to a magnetic field, and can therefore be referred to herein as a free layer (FL). Injector 324 and/or detector 326 may be separated from channel layer 328 by a thin electrically insulating barrier layer 338.

The portion of LSV reader 320 proximate to the bearing surface 302 does not include relatively thick synthetic antiferromagnetic (SAF) and antiferromagnetic (AFM) stacks that are typically present in, for example, current perpendicular-to-plane (CPP) Tunnel Junction Magnetoresistive (TMR) readers. Further, unlike conventional LSV readers in which both the injector and the detector are coincidentally on the top or the bottom of the channel layer, in LSV reader 320, detector 326 is positioned in a same plane as channel layer 328 with a thickness of detector 326 being approximately commensurate or substantially commensurate with a thickness of the channel layer 328 (i.e., a thickness of the detector 326 may be equal to, slightly greater than, or slightly less than the thickness of the channel layer 328). The position of detector 326 in the same plane as channel layer 328 yields a spacing between top shield 318 and bottom shield 322, denoted by SSS (shield-to-shield spacing), that is slightly more than the thickness of channel layer 328 by an insulation layer 334A that separates bottom shield 322 from channel layer 328 and detector 326. Insulation layer 334A is included to prevent shorting between injector 324 and detector 326. An insulation layer 334B separates top shield 318 from channel layer 328.

For allowing a detection current to flow to detector 326, spin injector 324 is connected to a current source (not shown) via terminal 330. Detector 326 is connected to a suitable voltage measuring device (not shown) via terminal 332.

First, the detection current from the current source is made to flow through the spin injector 324 and through the channel layer 328. This flow of current causes electron spins to accumulate in channel layer 328, which then transports the spins to the detector 326.

When the spins are transported to the detector 326, an electric potential difference, which varies depending upon an external magnetic field, appears between the detector 326 and the channel layer 328. The voltage measuring device detects electric potential difference appearing between the detector 326 and the channel layer 328. In this manner, the LSV reader 320 can be applied as an external magnetic field sensor for detecting bits stored on a magnetic data storage medium such as 350.

Figure 3B:
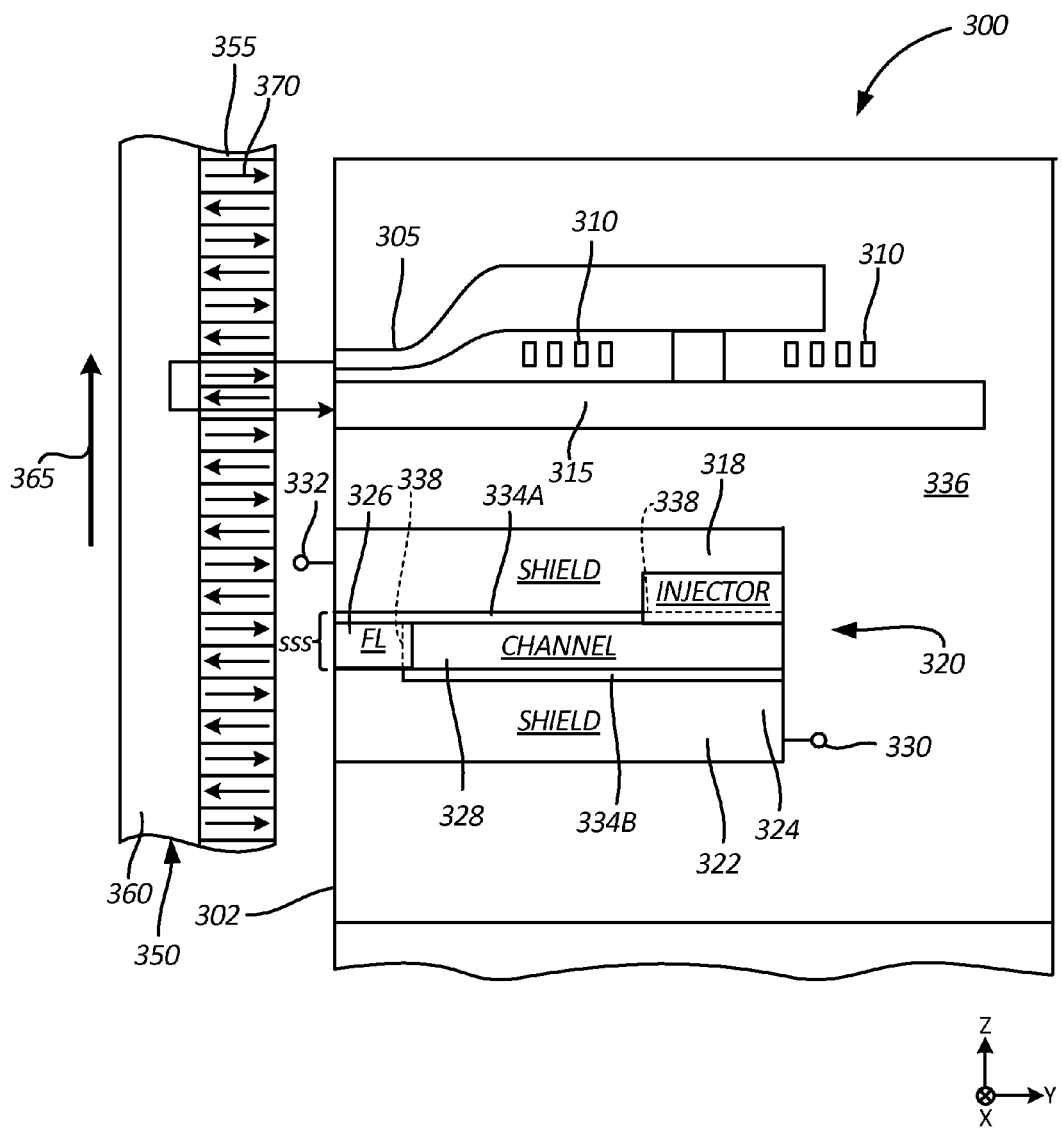
FIG. 3B is a schematic diagram of a cross-section of another embodiment of a recording head that reads from and writes to a storage medium.

In the embodiment shown in FIG. 3A, spin injector 324 is positioned below the channel layer 328. FIG. 3B shows an embodiment of a recording head 375 in which injector 324 is above channel 328. In other respects, recording head 375 is substantially similar to recording head 300 and therefore a description of individual elements of recording head 375 is not provided.

Figure 4A:
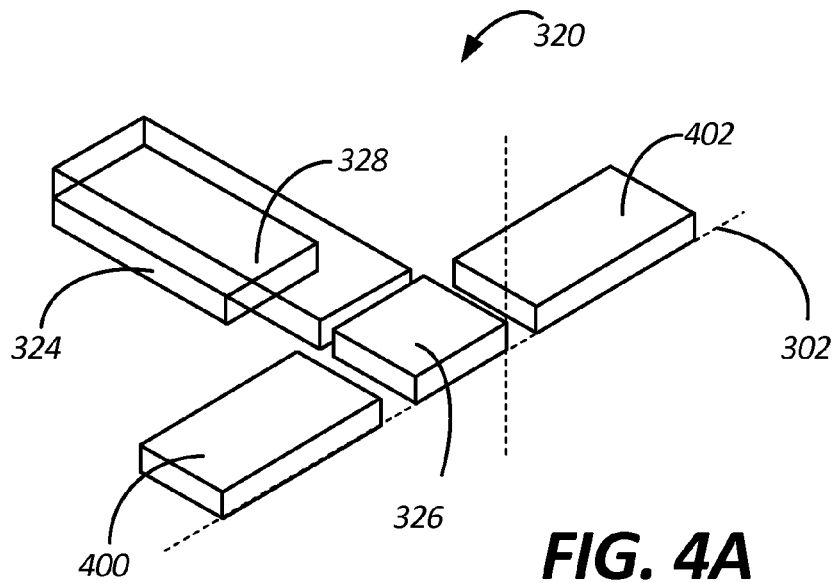
FIG. 4A is a schematic perspective view of a lateral spin valve reader included in the recording head of FIG. 3A.
Figure 4B:
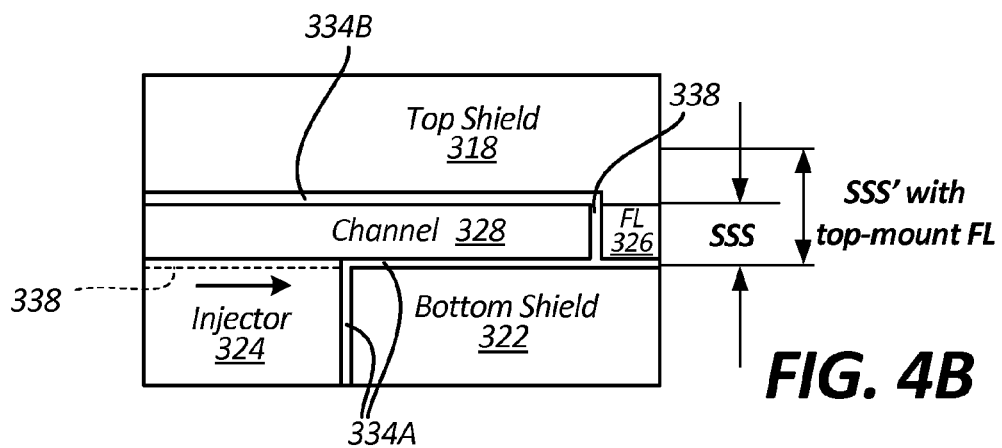
FIG. 4B is a schematic diagram of a cross-section of the lateral spin valve reader included in the recording head of FIG. 3A.
Figure 4C:
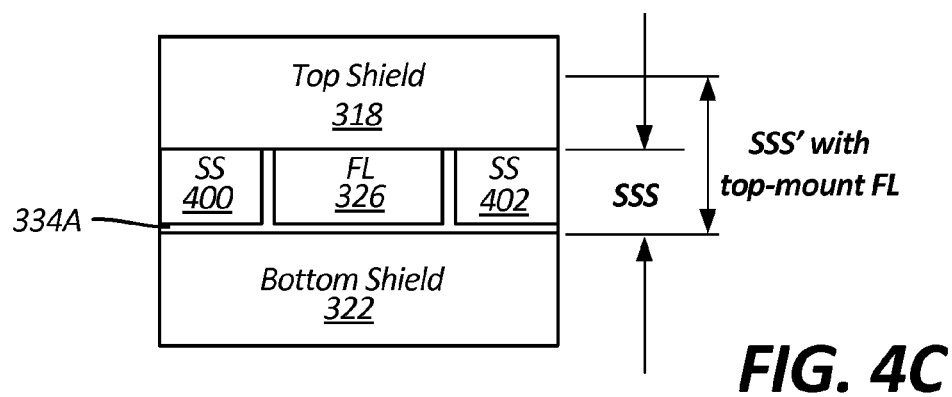
FIG. 4C is a bearing surface view of the lateral spin valve reader included in the recording head of FIG. 3A.

FIG. 4A is a schematic perspective view of LSV reader 320 included in recording head 300 of FIG. 3A. FIG. 4B is a schematic diagram of a cross-section of LSV reader 320 included in recording head 300 of FIG. 3A. FIG. 4C is a bearing surface view of LSV reader 320 included in recording head 300 of FIG. 3A. As noted earlier, LSV reader 320 includes injector 324, detector 326 and channel layer 328, with the detector 326 and the channel layer 328 being in the same plane. In the interest of simplification, top and bottom shields 318 and 332, insulating layer 334A and 334B, etc., are not shown in FIG. 4A. As shown in FIGS. 4A and 4C, side shields 400 and 402 are included for magnetostatic biasing of the FL/detector 326. As indicated earlier, SSS in LSV reader 320 is slightly greater than the thickness of channel layer 328 by the insulation layer 329 that separates bottom shield 322 from channel layer 328 and injector 326. In such embodiments, SSS for a channel thickness less than about 8 nanometers (nm) may be about 10 nm. In contrast, as shown in FIGS. 4B and 4C, SSS', which denotes a possible shield-to-shield spacing in a conventional LSV reader with a detector above the channel layer, is substantially larger than SSS.

Figure 5:
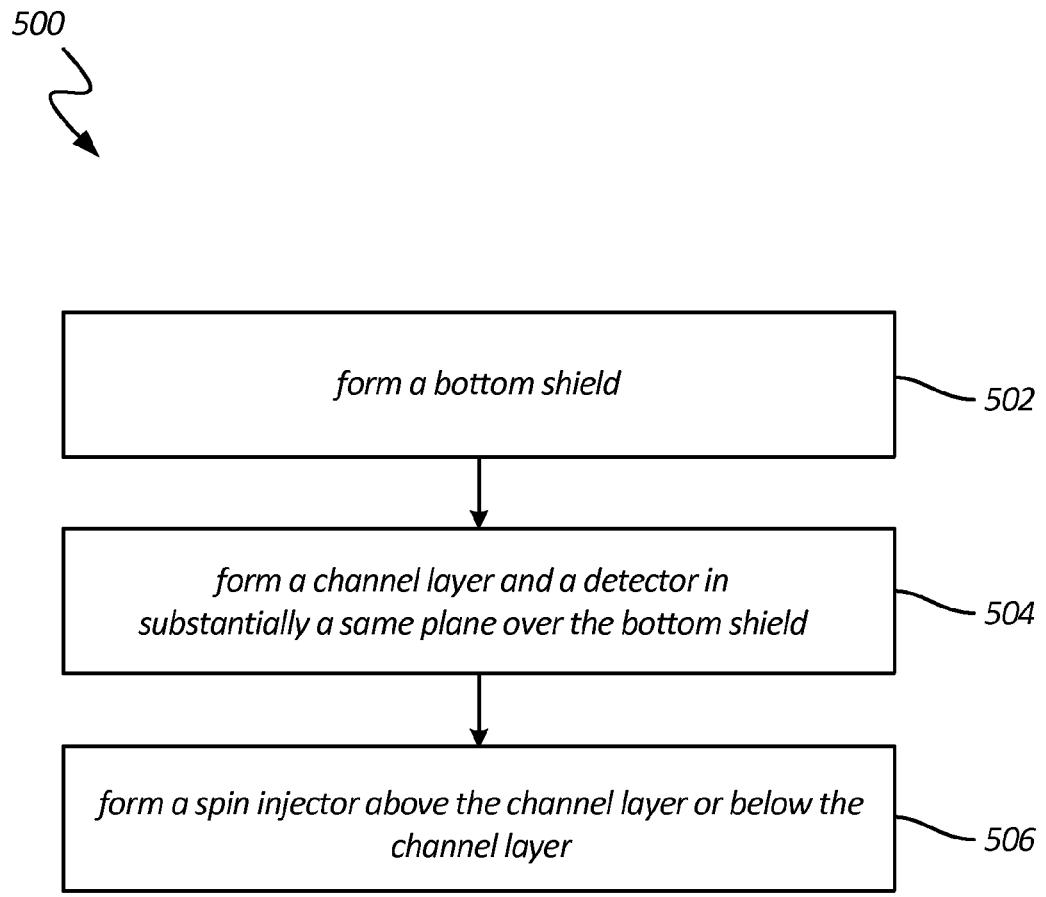
FIG. 5 is a simplified flow diagram of a method embodiment.

FIG. 5 is a simplified flow diagram 500 of a method of forming a LSV reader in accordance with one embodiment. The method includes forming a bottom shield at step 502. At step 504, a channel layer and a detector are formed in a same plane over the bottom shield. The method further includes forming a spin injector above or below the channel layer at step 506. In general, forming the channel layer and the detector in the same plane may pose a difficult fabrication process. One suitable process is described below in connection with FIGS. 6A-6J. However, it should be noted that any suitable fabrication process, which may be currently available or may be developed in future, may be used to form an LSV sensor such as 320.

Figure 6A:
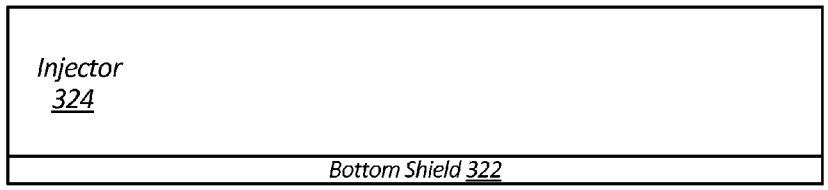
FIGS. 6A-6J are schematic diagrams of reader layers that collectively illustrate formation of a portion of a magnetic reproducing device in accordance with one embodiment.
Figure 6B:
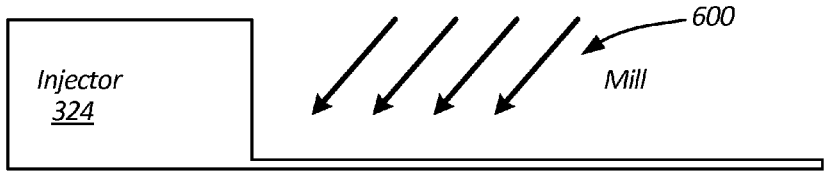
Figure 6C:
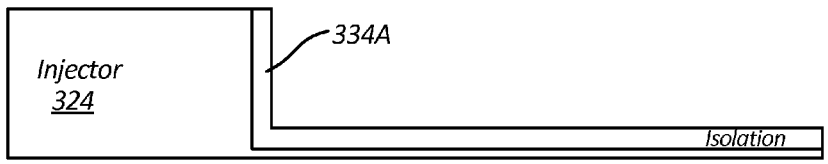
Figure 6D:
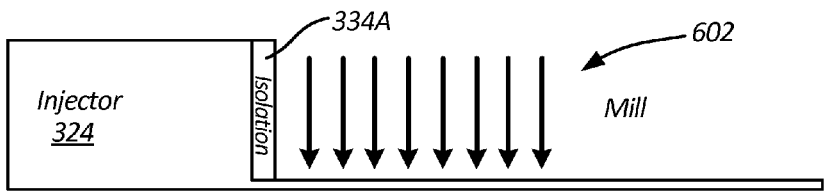
Figure 6E:
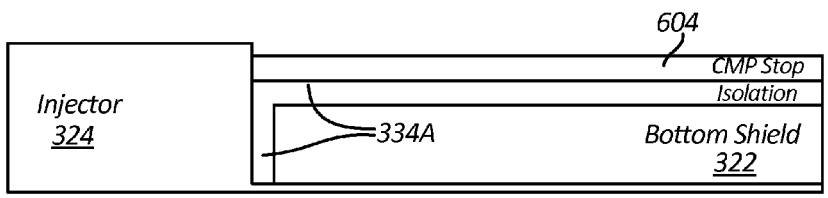
Figure 6F:
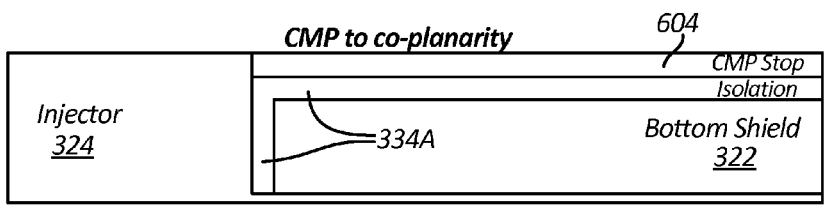
Figure 6G:
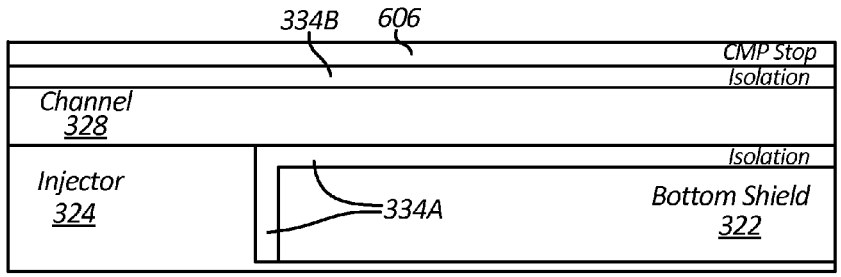
Figure 6H:
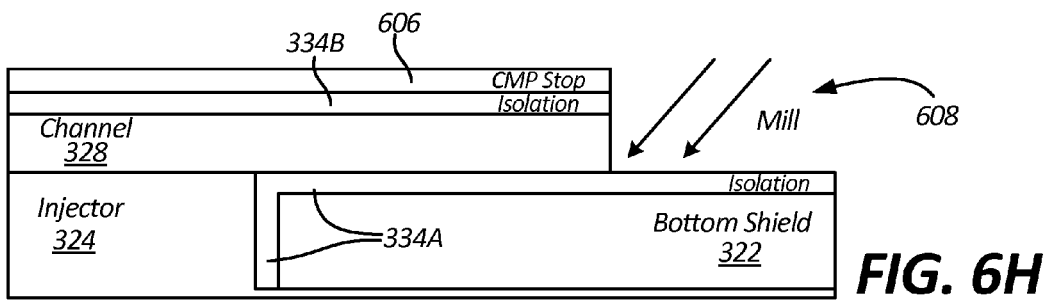
Figure 6I:
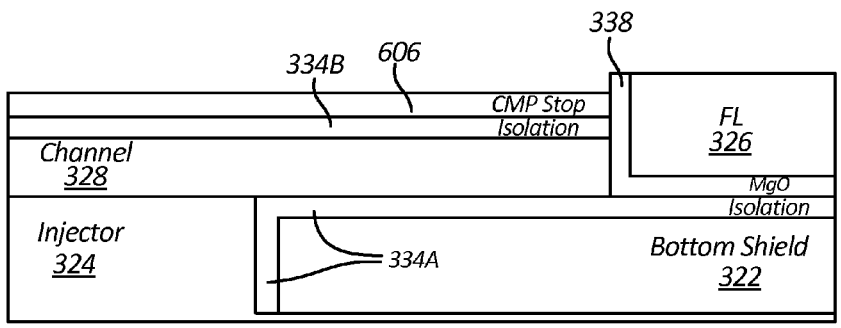
Figure 6J:
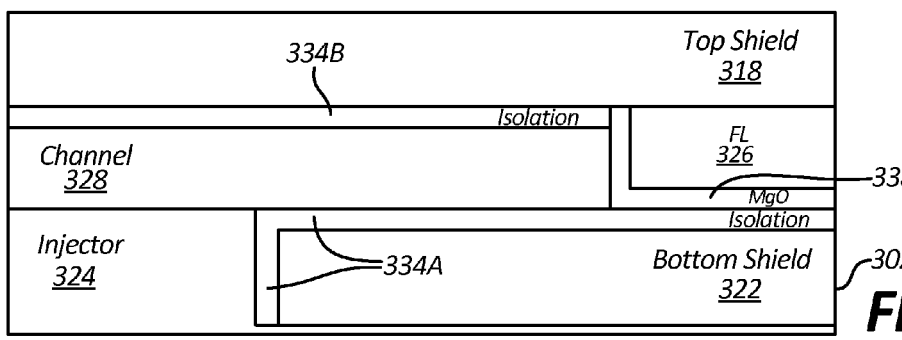

FIGS. 6A-6J are schematic diagrams of side views of portions of an LSV reader such as 320 during different intermediate stages of formation of the reader in accordance with one embodiment. As shown in FIG. 6A, an injector 324 is first deposited on top of a first portion of bottom shield 322. In the interest of simplification, the first portion of the bottom shield 222 is not shown in FIGS. 6B-6J. Second, an oblique milling process (or any other suitable material-removal process such as a reactive-ion etching process), denoted by reference numeral 600, is carried out to remove a portion of the injector 324 and to obtain a vertical profile as shown in FIG. 6B. A mill resistant mask may be applied to the top of the portion of the injector 324 shown in FIG. 6B prior to carrying out the milling process. Use of the mill resistant mask may help obtain a suitable profile for consecutive deposition. Third, a first portion of first isolation layer 334A is deposited (FIG. 6C) followed by the removal of a horizontal segment of that layer by a vertical milling process denoted by reference numeral 602 in FIG. 6D. This leaves behind a substantially vertical segment of layer 334A, which is in contact with injector 324. A second portion of the bottom shield 322 (FIG. 6E) is then deposited beside the vertical segment of layer 334A. At this stage, a suitable removal operation may be carried out to clear a side wall. This is followed by deposition of a second portion of first isolation layer 334A on the second portion of bottom shield 322 as shown in FIG. 6E. A material which will be referred to herein as a chemical-mechanical-polishing stop material (CMP-stop) is then deposited over the second portion isolation layer 334A and is shown as layer 604 in FIG. 6E At this point, a height of injector 324 is greater than a total height of the second portion of bottom shield 322, the second portion of first isolation layer 334A and the CMP-stop layer 604. The structure shown in FIG. 6E is planarized by employing a suitable CMP process. Since injector 324 is not capped with a CMP-stop layer, after completion of the CMP process, a top surface of injector 324 and a top surface of CMP-stop layer 604 are coplanar as shown in FIG. 6F. After the CMP process, a suitable etching process is that carried out to remove the CMP-stop layer and a part of the injection layer from the planarized structure. Next, channel layer 328, second isolation layer 334B and CMP-stop layer 606 are deposited as shown in FIG. 6G. An oblique milling process, denoted by reference numeral 608, is then carried out to remove portions of channel layer 328, second isolation layer 334B, and CMP-stop layer 606 to obtain a vertical profile as shown in FIG. 6H. Again, a mill resistant mask (not shown) may be applied to the top of the portion of the CMP-stop layer 608 shown in FIG. 6H prior to carrying out the milling process. As indicated earlier, use of the mill resistant mask may help obtain a suitable vertical or shallow profile for consecutive deposition. Then, as shown in FIG. 6I, barrier layer (for example, MgO) 338 and detector/FL 326 are deposited to be higher than a combined height of the channel layer 328, the isolation layer 334 and the CMP-stop layer 608 layer so that there is some extra material for CMP removal. The structure shown in FIG. 6I is planarized by employing a suitable CMP process. After the CMP process, a suitable etching process may be carried out to remove contaminants from the planarized structure. This is followed by deposition of top shield 318 as shown in FIG. 6J.

Figure 7A:
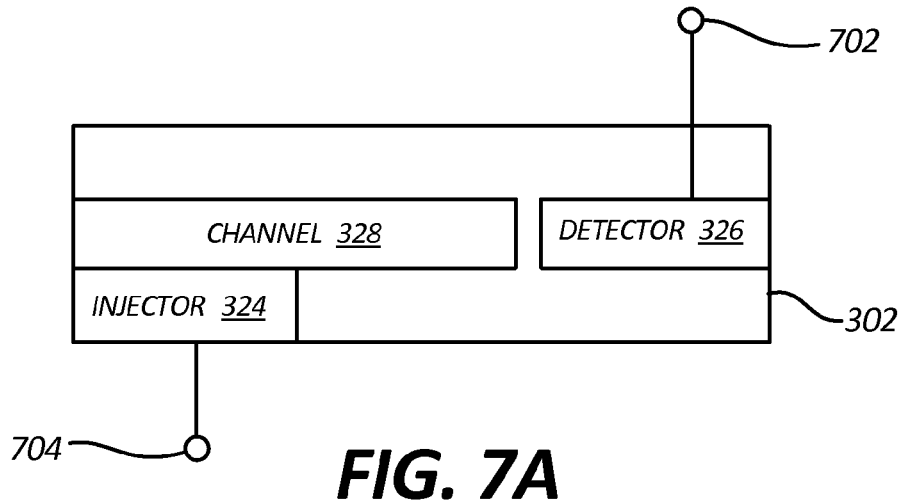
FIGS. 7A, 7B and 7C are schematic diagrams of cross-sections of lateral spin valve readers with different lead terminal configurations.
Figure 7B:
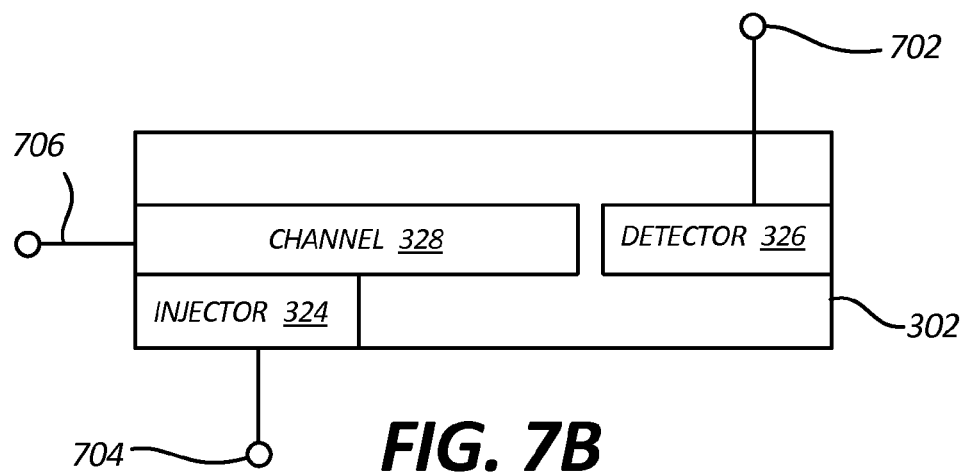
Figure 7C:
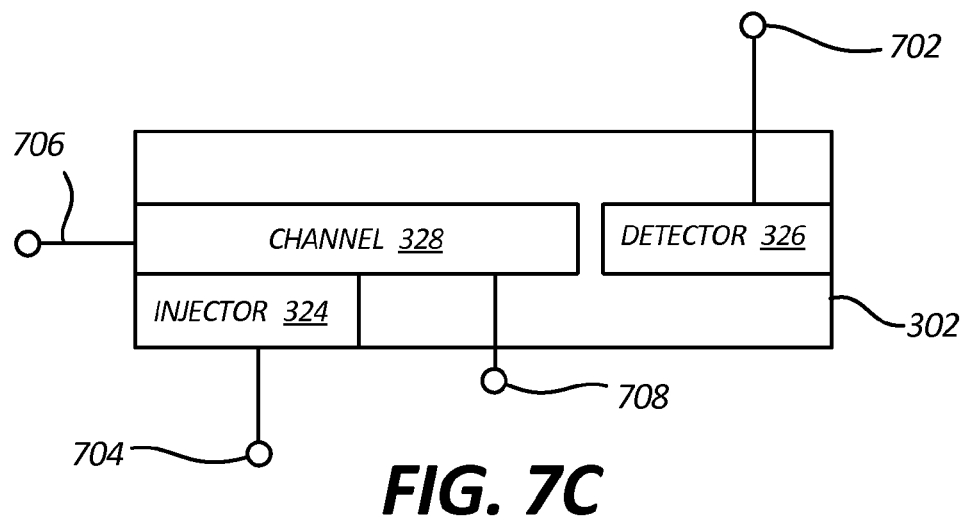

It is noted that two, three, four, or any other number of contacts may be implemented in various embodiments of the LSV reader. The contact configuration utilized depends on a type of detection scheme and application. FIG. 7A shows an example of an LSV reader such as 320 that has a two-terminal/two-contact (702 and 704) configuration. FIG. 7B shows an example of an LSV reader 320 that has a three-terminal/three-contact (702, 704 and 706) configuration, and FIG. 7C shows an example a four-terminal/four-contact (702, 704, 706 and 708) configuration.

It should be noted that, in the two-terminal embodiment of FIG. 7A, the current through the channel 328 is comprised of both drift (motion of charge carriers due to a force exerted on them by an electric field) and diffusion (movement of carrier particles from a region of higher concentration to a region of lower concentration that may occur in the absence of an electric field) components. However, in the four-terminal configuration of FIG. 7C, only a diffusion component of the current drives the signal at the detector 326. This is because, in the embodiment of FIG. 7C, a voltage/current source (not shown) that provides the electric field for the drift component is connected between terminals 704 and 706 and therefore the drift component is present primarily in the path that includes the voltage/current source, the injector 324 and the channel 328. This leaves only a diffusion component of the current at the detector 326 in the embodiment of FIG. 7C.

It should also be noted that in the case of the two-terminal configuration there may be a relaxed requirement on tunnel barrier quality since an electric field predominantly drives the transport and tunneling processes. Therefore, some embodiments of the LSV sensor with both the channel and the detector in the same plane may favor a two-terminal configuration.

Figure 8A:
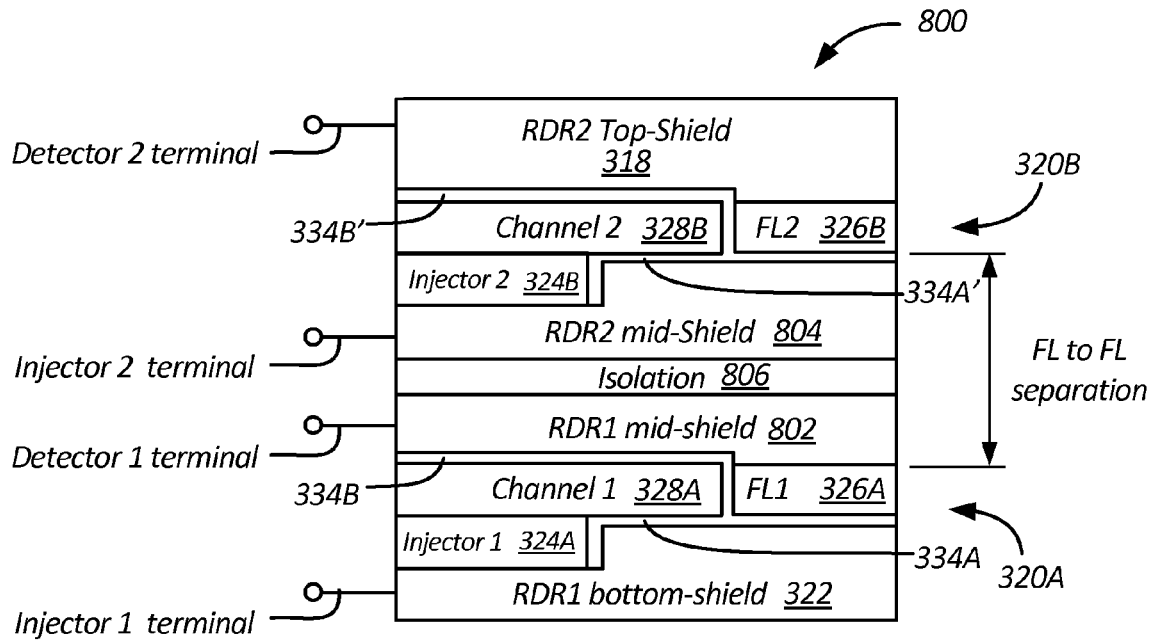
FIG. 8A is a diagrammatic illustration of a cross-section of a multi-sensor reader in accordance with one embodiment.
Figure 8B:
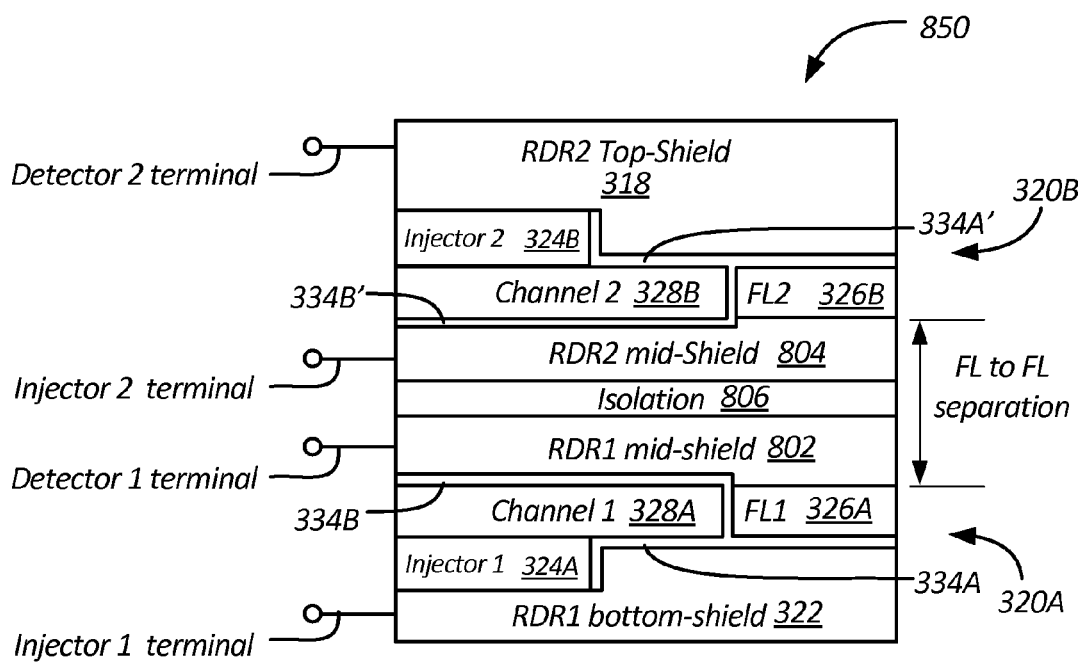
FIG. 8B is a diagrammatic illustration of a cross-section of a multi-sensor reader in accordance with another embodiment.

As indicated earlier in connection with the description of FIG. 3A and 3B, an LSV reader such as 320 has an extremely narrow shield-to-shield spacing proximate to a bearing surface such as 302. Therefore, it is a very suitable reader design to implement in a multi-sensor configuration where two or more readers are stacked on top of each other within a single recording head such as 300. One example of a dual-reader configuration is shown in FIG. 8A. The embodiment of reader 800 in FIG. 8A includes a top shield 318, a bottom shield 322 and LSV readers 320A and 320B interposed between top shield 318 and bottom shield 322. Reader 320A includes an injector 324A, a detector 326A and a channel 328A in a same plane as detector 326A. Similarly, reader 320B includes an injector 324B, a detector 326B and a channel 328B in a same plane as detector 326B. In readers 320A and 320B, injectors 324A and 324B are positioned below channel layers 328A and 328B, respectively. Isolation layers in reader 320B are denoted by 334A' and 334B'. In the embodiment shown in FIG. 8A, a two-terminal connection configuration is used for each shield. Accordingly, bottom shield 322 and a middle shield 802 are utilized for electrical connection to reader 320A. Similarly, a middle shield 804 and top shield 318 are utilized for electrical connection to reader 320B. A suitable isolation layer 806 is interposed between middle shields 802 and 804 to provide the necessary electrical isolation between the shields. FIG. 8B shows an embodiment of a reader 850, which includes elements that are substantially similar to the elements of reader 800. However, in reader 850, injector 324B is positioned above channel layer 328B. This may allow for a relatively thin and uniform mid-shield 804.

In the multi-sensor configuration, a critical parameter is the FL-to-FL separation shown in FIGS. 8A and 8B. Reducing the FL-to-FL separation enables the multi-sensor reader to be implemented in a high linear density drive. Substantially drastic FL-to-FL separation reduction may be achieved by implementing LSV-based magnetic readers with channels and detectors in a same plane because, as noted above, they eliminate the thicknesses of SAF and AFM stacks at the bearing surface that are typically present in, for example, CPP TMR readers, and also eliminate an additional free layer thickness in a conventional LSV reader. Additionally, the relatively thin and uniform mid-shield 804 of FIG. 8B may result in a further reduction in FL-to-FL separation. It should be noted that FIGS. 8A and 8B are illustrative embodiments of a multi-sensor readers and, in other embodiments, more than two sensors may be employed.

Although various uses of the LSV reader with the in-plane detector are disclosed in the application, embodiments are not limited to the particular applications or uses disclosed in the application. It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the LSV reader with the in-plane detector while maintaining substantially the same functionality without departing from the scope and spirit of the present disclosure. In addition, although the preferred embodiment described herein is directed to particular type of LSV reader with the in-plane detector utilized in a particular data storage system, it will be appreciated by those skilled in the art that the teachings of the present disclosure can be applied to other data storage devices without departing from the scope and spirit of the present disclosure.

What is claimed is:

1. A lateral spin valve reader comprising:
    a detector located proximate to a bearing surface;
    a spin injector located away from the bearing surface;
    a channel layer substantially extending from the detector to the spin injector, wherein the channel layer and the detector are substantially in a same plane, and wherein no portion of the channel layer is at the bearing surface, and wherein a thickness of the channel layer is substantially commensurate with a thickness of the detector; and
    an insulator between the channel layer and a bottom shield,
    wherein a spacing between the bottom shield and a top shield at the bearing surface comprises only a sum of the thickness of the detector and a thickness of the insulator between the channel layer and the bottom shield.

2. The lateral spin valve reader of claim 1 and wherein the spin injector is positioned above the channel layer.

3. The lateral spin valve reader of claim 1 and wherein the spin injector is positioned below the channel layer.

4. The lateral spin valve reader of claim 1 and further comprising a two-terminal configuration, a three-terminal configuration or a four-terminal configuration.

5. A multi-sensor reader including the lateral spin valve reader of claim 1.

6. A method of forming a recording head comprising:
    forming a bottom shield;
    forming a channel layer and a detector in substantially a same plane over the bottom shield with no portion of the detector directly over the channel layer and with no portion of the detector directly under the channel layer; and
    forming a spin injector below the channel layer, wherein forming the spin injector below the channel layer comprises depositing the spin injector over a first portion of the bottom shield;
    carrying out a material-removal process to reduce a size of the spin injector;
    depositing a substantially vertical portion of a first isolation layer on a side of the spin injector; and
    depositing a second portion of the bottom shield above the first portion of the bottom shield and beside the substantially vertical portion of the first insolation layer such that the spin injector, the substantially vertical portion of the first isolation layer and the second portion of the bottom shield are above the first portion of the bottom shield and such that the substantially vertical portion of the first isolation layer is between the second portion of the bottom shield and the spin injector.

7. The method of claim 6 and further comprising:
    depositing a second portion of the first isolation layer above the second portion of the bottom shield; and
    depositing a chemical-mechanic polishing (CMP) stop layer on the second portion of the first isolation layer.

8. The method of claim 7 and further comprising carrying out a CMP process to reduce a height of the spin injector such that, a top surface of the spin injector and a top surface of the CMP stop layer are substantially coplanar.

9. The method of claim 8 and further comprising depositing the channel layer over the spin injector and the isolation layer.

10. The method of claim 9 and further comprising:
    depositing a second isolation layer above the channel layer; and
    depositing a CMP stop layer on the second isolation layer.

11. The method of claim 10 and further comprising carrying out a milling process to form a space beside the channel layer.

12. The method of claim 11 and further comprising depositing a barrier and depositing a free layer in the space beside the channel layer such that the free layer and the channel layer are in substantially the same plane.

* * * * *